June 9, 1931.  M. CASTRO  1,809,266
REEL
Original Filed Oct. 2, 1928  2 Sheets-Sheet 1
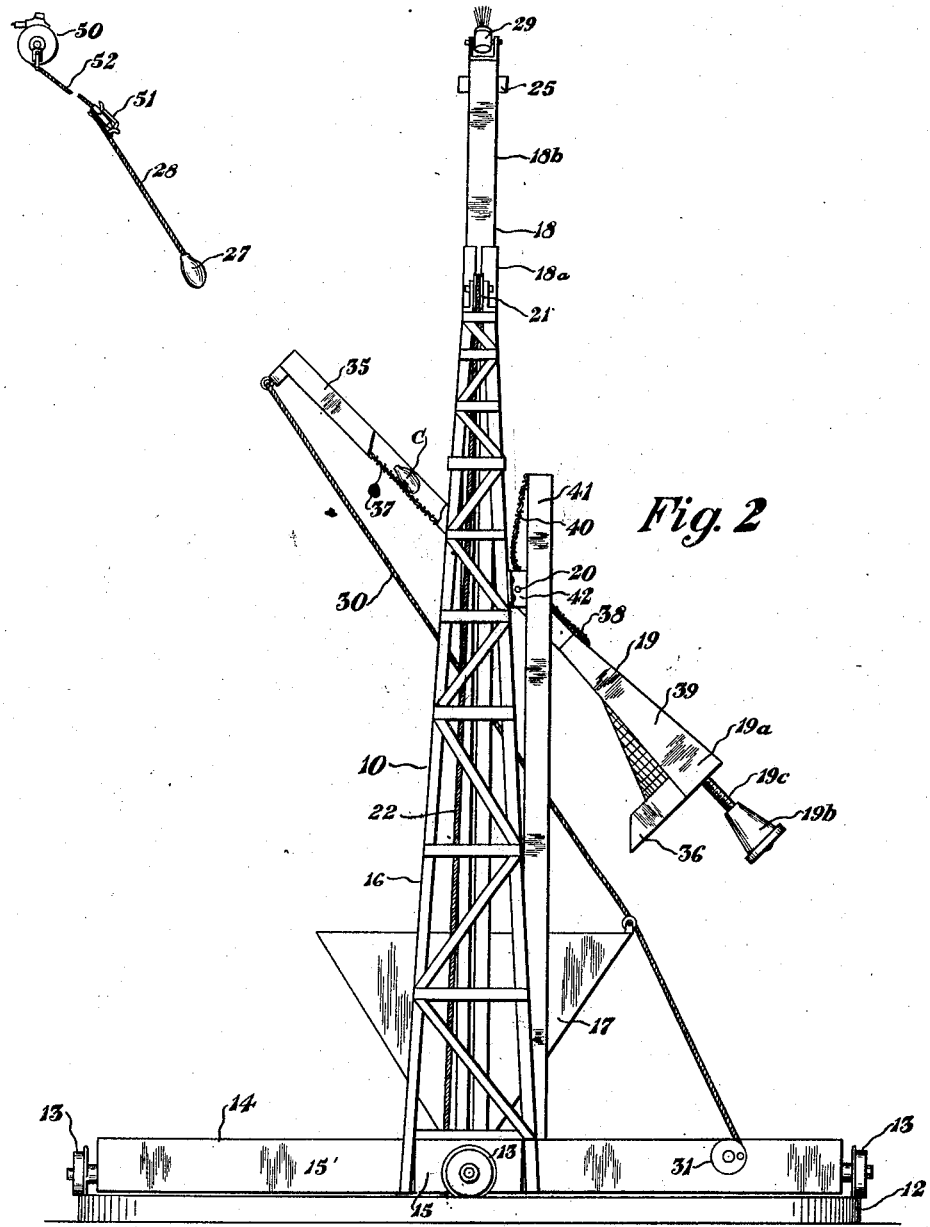
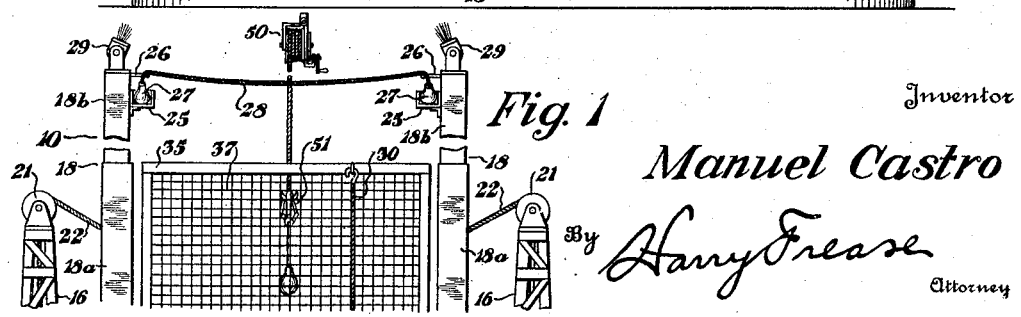
Inventor
Manuel Castro
By Harry Frease
Attorney June 9, 1931. M. CASTRO 1,809,266
REEL
Original Filed Oct. 2, 1928    2 Sheets-Sheet 2
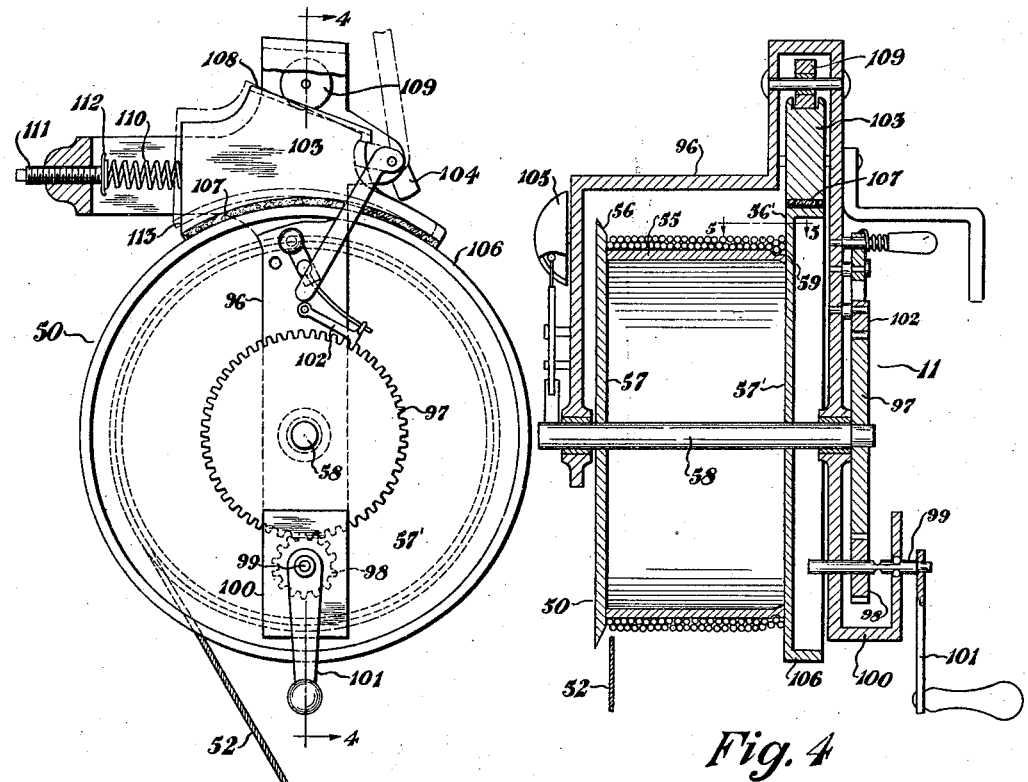
Fig. 3
Fig. 4
Fig. 5
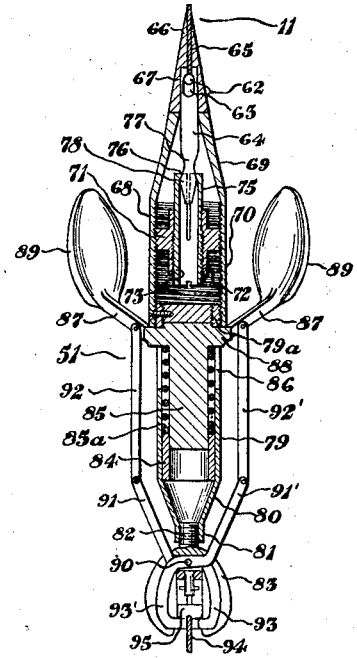
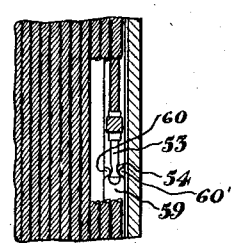
Inventor
Manuel Castro
By Harry Frease
Attorney Patented June 9, 1931

1,809,266

UNITED STATES PATENT OFFICE

MANUEL CASTRO, OF CANTON, OHIO

REEL

Original application filed October 2, 1928, Serial No. 309,881. Divided and this application filed November 3, 1928. Serial No. 317,060.

My invention relates to aircraft elements including reels particularly adapted for use in apparatus for picking up and discharging cargo from aircraft in flight, and the present invention is a division of the subject matter set forth in my prior application for patent for cargo handling apparatus for aircraft and the like, filed October 2, 1928, Serial No. 309,881.

Such apparatus necessarily includes elements operatively mounted on the ground, or on a ground structure, or on a ship, hereinafter termed the ground elements, for positioning the cargo to be picked up and for receiving the cargo to be discharged, and also includes elements operatively mounted on the aircraft, hereinafter termed the aircraft elements, for cooperating with the ground elements in picking up and discharging cargo.

A fundamental requirement for the successful operation of such apparatus, is to impart to the cargo to be picked up from rest, the required acceleration so that it will attain the velocity or flying speed of the aircraft without reducing the flying speed of the aircraft to any considerable extent.

For example it is estimated that for an aircraft of 2,000 pounds gross load (total weight lifted), and with sufficient excess power to climb 300 ft./min., there is available sufficient excess thrust to provide a force of approximately 97.5 lbs. at 70 M. P. H. flying speed, for use in imparting to the cargo being picked up from rest the necessary acceleration so that it will attain the desired velocity.

Under these circumstances the distance required to be covered by the cargo from the instant it is connected with the pick up means until it attains the speed of the aircraft is as follows:

|  | Feet |
|---|---|
| For 50 lbs. cargo, distance | 84.3 |
| For 40 lbs. cargo, distance | 67.5 |
| For 30 lbs. cargo, distance | 50.6 |
| For 20 lbs. cargo, distance | 33.7 |
| For 10 lbs. cargo, distance | 16.9 |

In other words, it is necessary for the successful operation of such apparatus that the pick up means be secured to a cable which is permitted an extension of 84.3, 67.5, 50.6, 33.7, or 16.9 feet according to the load to be picked up, as aforesaid.

Accordingly the objects of the present invention include the provision of improved aircraft elements including an improved reel, more particularly for the improved cargo handling apparatus for aircraft and the like of my aforesaid prior application, in which the aircraft elements include pick up means, a cable upon which the pick up means are secured, and yielding means for permitting the necessary extension of the cable for imparting the aforesaid acceleration to the cargo being picked up from rest.

Further objects of the present invention include the provision of improved aircraft elements enabling improved cooperating action of the aircraft elements and the ground elements.

Further objects of the invention include the provision in the improved reel of a novel safety connection between the cable and the reel, whereby if the pick up means become caught in an immovable or heavy object, the cable will be released from the reel when the force on the cable thus exerted becomes greater than a predetermined amount.

These and ancillary objects are attained in the improved aircraft elements for aircraft cargo handling apparatus and the like comprising the present invention, a preferred embodiment of which is hereinafter set forth in detail, and is illustrated in the accompanying drawings forming part hereof, in which Figure 1 is a fragmentary front elevation illustrating the improved aircraft elements in use with aircraft cargo handling apparatus, and ready for automatic operation at night for discharging a cargo and picking up another cargo;

Fig. 2, a fragmentary side elevation thereof illustrating the improved aircraft elements in use with the aircraft cargo handling apparatus just after the cargo has been discharged and received by the ground elements and the new cargo has been picked up by the aircraft elements;

Fig. 3, a fragmentary elevation view illustrating the improved aircraft elements of the apparatus, including the present improved reel, the cable, and the preferred improved combined automatically actuated cargo pick up hook and discharging means, the hook and discharging means being illustrated in section;

Fig. 4, a sectional view of the improved reel as on line 4—4, Fig. 3; and

Fig. 5, a fragmentary view thereof illustrating the cable releasing means, as on line 5—5, Fig. 4.

Similar numerals refer to similar parts throughout the drawings.

The improved cargo handling apparatus includes the ground elements indicated generally at 10 in Figs. 1 and 2, and the aircraft elements indicated generally at 11 in all of the remaining figures of the drawings.

The ground elements 10 are completely illustrated and described in my aforesaid prior application, and are here illustrated and described, sufficiently for the purpose of setting forth the preferred use of the improved reel hereof and include a circular track 12 mounted on a suitable foundation on the ground, or on a ground structure, or on a ship, and on which track are arranged to roll wheels 13 which are rotatably mounted on and support a base frame 14; whereby the base frame 14 and the remaining ground elements may be rotated about a vertical axis for placing the ground elements in the proper position with respect to the wind and the aircraft from which cargo is to be handled.

The base frame 14 may be in the form of a cross, and may include axially and centrally intersecting panels 15 and 15' at the outer ends of each of which the wheels 13 are rotatably mounted.

Preferably at equal distances from and on opposite sides of the vertical axis, the base panel 15 has mounted thereon upwardly extending towers 16.

A cargo receiving hopper 17 is preferably arranged between the towers 16.

Between opposite sides of the hopper 17 and the towers 16, upwardly extending telescopic masts 18 are mounted on the base panel 15, and the vertical axes of the towers and the masts are preferably parallel and in the same plane.

A tipping receptacle 19, into which cargo is discharged, is mounted for rotation between the telescopic masts 18 about horizontal pivots 20 which are supported on the masts 18.

Each telescopic mast 18 includes a lower tubular member 18a within which an upper extensible member 18b is slidably mounted.

A pulley 21 is journalled at the top of each tower 16.

One end of a rope or cable 22 is secured to the extensible member 18b within each tubular member 18a, and each cable 22 passes out from the top of the tubular member 18a, over the pulley 21, and longitudinally through a tower 16, and about a direction changing pulley, not shown, at the base thereof, to a hoisting drum, not shown, journalled in the base panel 15, where the other end of each rope or cable 22 is secured to the drum; and the drum is adapted in a well known manner for reversely winding and unwinding the ropes or cables 22 thereabout, for simultaneously raising and lowering the extensible members 18b.

At the inside face of the upper end of each extensible mast member 18b, a cargo positioning platform 25 is mounted.

Above the platform 25, a cargo connecting cable guide hook 26 is mounted on each mast member 18b.

A bag 27 containing parts of the cargo to be picked up may be supported on each platform 25.

The cargo connecting cable 28 may extend horizontally from guide hook to guide hook, and downwardly therefrom to the bags 27, the guide hooks opening in a direction perpendicular to the plane of the masts from one side of such plane.

For night operation, a beam search light 29 is mounted at the top of each extensible mast member 18b, and arranged to be rotated about a horizontal axis perpendicular to the plane of the masts; whereby for night operation of the improved cargo handling apparatus the search lights 29 are adjusted so that their beams intersect on the vertical axis of the ground elements midway between the masts, at a predetermined distance above the then horizontally extending connecting cable 28, so that the pilot of the oncoming aircraft may steer his craft by the intersection of the beams of the search lights.

A cable 30 is connected at its upper end with the tipping receptacle 19 and at its lower end with a suitable preferably automatic retrieving drum 31 for manually tipping the receptacle 19.

For day-time operation, flag signals may be substituted for the search lights 29.

The tipping receptacle 19 preferably includes members forming a closed frame 35 which terminates in a chute 36.

A preferably wire spring fabric 37 is stretched entirely across the frame opening and secured to the frame members at the off-side thereof; and a preferably wire spring fabric 38 is stretched across the lower end of the frame opening and secured to the frame members at the on-side thereof, forming a pocket at 39 at the lower end of the receptacle 19 into which cargo may drop and be delivered therein to the chute 36, and thence to the hopper 17.

The upper end of the on-side fabric 38 preferably extends free of the frame at 40 and therefrom upwardly to a position where it is secured at the ends of posts 41 provided at the on-side of the masts for this purpose and also for the purpose of forming a support for off-set bearing blocks 42 in which the receptacle pivots 20 are preferably journalled.

As illustrated in Fig. 2, the tipping receptacle 19 is provided at its lower end 19a with a counterbalance 19b slidably mounted on a screw 19c extending downwardly from the tipping receptacle.

Accordingly if a cargo bag C strikes the upper end of the receptacle 19, and is discharged thereon, the cargo bag C will either drop into the pocket 39 and out through the chute 36 into the hopper 17 or will rotate the upper end of the tipping receptacle 19 downwardly to a position from which the cargo bag C will drop directly into the hopper 17, depending upon the velocity with which the cargo bag C strikes the tipping receptacle.

The foregoing constitute the preferred embodiment of the ground members of my improved cargo handling apparatus for aircraft and the like.

The improved aircraft members of the improved cargo handling apparatus include the present improved reel 50 suitably mounted in the aircraft fuselage not shown, and the preferred improved combined pick up hook and discharging means 51, releasably connected to each other by a cable 52.

The reel end of the cable has secured thereon a releasing head 53 which has formed therein a neck groove 54.

The improved reel 50 includes a cylindric barrel 55 preferably provided at its ends with outwardly extending flanges 56 and 56', and the flanges may be the outer peripheral portions of end disks 57 and 57' for the reel barrel, which are secured to the reel shaft 58 extending therethrough, and coaxial with the barrel.

At one side of the outer surface of the reel barrel, an annular groove 59 is provided, and in which groove the releasing head 53 is arranged to lie, so that lugs 60 and 60' extending from the sides of the groove 59 may fit in the neck grove 54 of the head 53, for securing the cable to the reel barrel during normal operation of the reel.

If the cable 52 becomes entirely unwound from the reel barrel by reason of the fact that the pick up means has become hooked upon an immovable object, the head 53 will become disengaged from the lugs 60 and 60', so that the aircraft will not lose flying speed and fall or be otherwise damaged by the jerk on the cable 52.

The cable 52 is sufficiently long for being extended or payed out from the reel against a suitable unwinding reaction, in order that the aforesaid acceleration may be imparted to the cargo being picked up.

The outer end of the cable 52 passes through suitable guide rollers 61 in the bottom of the aircraft fuselage, and is manually removably connected with the combined pick up hook and discharging means 51, preferably by means of an enlarged head 62 formed on the end of the cable 52, and which head fits in a side opening socket 63 in a shank 64 extending from and normally secured to the pick up hook and discharging means. The cable is first passed with a sliding fit through an aperture 65 in a ferrule 66 and the aperture 65 communicates at its outer end with an enlarged outwardly opening socket 67 which tightly but slidably fits over the outer end of the shank 64, thereby releasably retaining the enlarged cable end head 62 in the socket 63.

The shank 64 extends as aforesaid outwardly and co-axially with the longitudinal axis of the pick up hook and discharging means 51, which means includes a tubular connecting head 68 which is tapered at its outer end as at 69 so that the outer surfaces of the ferrule and the connecting head will merge with each other for permitting the connecting cable of the cargo to be picked up, to slide easily thereover.

The cylindric body of the outer end portion 70 of the connecting head 68 is internally threaded and an externally threaded releasing jaw mounting plug 71 is screwed therein at a suitable longitudinal position.

The jaw mounting plug is provided with a threaded central aperture 72 therein, and in which is screwed the threaded outer end 73 of a set of tubular spring jaws 75; whereby, depending on the relative axial position of the tubular spring jaws and the plug 71, the end opening 76 of the jaws may be varied, and the gripping power of the jaws may be varied by screwing the threaded end of the jaws in the threaded aperture of the plug one way or the other.

The end of the shank 64 within the tubular connecting head 68 has formed therein a groove 77, thus providing an outer releasing head 78 which may be gripped by a varied force as aforesaid by the spring jaws 75.

Accordingly, these jaws may be adjusted so that if a force greater than 250 pounds for example is applied upon the pick up hook and discharging means opposite to the pull of the cable 52, the shank 64 will automatically disconnect from the pick up hook and discharging means, even though the cable has not been entirely unwound.

The automatic releasing of the reel end of the cable as aforesaid, and the automatic releasing of the pick up hook and discharging means are essential for insuring that the aircraft will not lose flying speed regardless of what force the pick up hook and discharging means may be subjected to.

The threaded end 79a of a hook and jaw mounting sleeve 79 is screwed into the connecting head 68, the other end of the sleeve 79 is tapered at 80 and terminates in a reduced portion 81 in which a threaded connector 82 of a discharging tong mounting bracket 83 is screwed.

A relatively short spring seat and piston guide sleeve 84 is secured within the sleeve 79 adjacent the tapered end 80 thereof and the interior surface of the guide sleeve 84 forms a guide for a hook carrying piston 85 slidable therein.

As viewed in Fig. 3, the upper end of the sleeve 79 is provided with a plurality of longitudinally extending notches 86 for permitting hook arms 87 to extend therethrough from the piston 85, the several hook arms being strengthened by sectoral webs 88 connecting the same outside of the sleeve 79.

The piston 85 is inserted within a compression spring 85a, one end of which reacts against the inner end of the guide sleeve 84, and the other end of which reacts against the hook arms 87 to normally urge the piston and hook arms towards the connecting head 68.

Each hook arm 87 extends outwardly and upwardly as viewed in Fig. 3 and terminates preferably in a spoon end 89.

The mounting bracket 83 is preferably in the form of an outwardly opening U, and a pivot pin 90, at the base of the U adjacent the connector 82, forms a pivotal mounting for discharging tong arms 91 and 91′, respectively, the upper ends of which above the pivotal mounting are pivotally connected with adjacent ends of links 92 and 92′, respectively, and the upper ends of the links are pivotally connected each with one of the hook arms 87.

The lower ends of the tong arms 91 and 91′ below the pivotal mounting 90 are provided with laterally extending terminal hooks 93 and 93′, which in the position illustrated in Fig. 3, form a ring-like closure for the eye 94 of a cable secured to the cargo bag to be discharged.

Accordingly, when any of the hook arms 87 are moved downwardly, as viewed in Fig. 3, the tongs will be actuated to separate the terminal hooks 93 and 93′, thereby releasing the same from the eye 94.

For insuring the discharge of the eye 94 from the terminal hooks, a spring pressed plunger 95 is mounted within the U opening of the mounting bracket 83.

The reel shaft 58 is journalled in a suitable reel mounting bracket 96, and the ends of the shaft extend outwardly therefrom, and a gear wheel 97 is secured at one end of the shaft 58 and arranged to be selectively engaged by a drive pinion 98 secured on a sliding stub shaft 99, which is slidably and rotatably mounted in a suitable U extension 100 of the reel mounting bracket 96, so that the driving pinion 98 may be engaged and disengaged with the gear wheel 97.

The outer end of the stub shaft 99 is provided with a removable drive crank 101.

A spring pressed pawl 102 is pivotally mounted on the reel bracket 96 for selective engagement with the gear wheel 97 for permitting either ratcheting of the reel shaft when the crank 101 is rotated to reel-in the cable 52, or free rotation of the reel.

For applying the necessary unwinding reaction to provide for the paying out of the cable 52 after hooking a cargo, a spring pressed brake shoe 103 is suitably mounted in the frame 96, and a lever pawl 104 is provided for selectively maintaining the brake shoe in or out of operative position.

An alarm bell 105 is mounted at the other side of the frame 96 and adapted to be rung by rotation of the shaft 58.

The improved cargo handling apparatus for aircraft thus described, is used for picking up and discharging cargo by arranging the ground elements as illustrated in Figs. 1 and 2, and by paying out the cable 52 from the aircraft in which the reel 50 is carried, a suitable distance depending on the weight of the cargo C to be discharged, and which cargo is carried by the combined pick up hook and discharge means 51, the discharge terminal hooks 93 and 93′, as aforesaid, passing through the eye 94 connected with the cargo C to be discharged.

In the day-time the pilot on the oncoming aircraft guides the aircraft by flying between flag signals at the proper height, the frame 14 having been rotated so that the aircraft will fly preferably into the wind between the flag signals.

In night-time operation, the pilot steers his course by the intersection of the beams of the search lights 29.

The cable 52 will first strike the cable 28 connecting the cargos 27 to be picked up, and the reel cable 52 will be dragged over the transversely extending cargo connecting cable 28, until one of the spoon ended hook arms 87 hooks against the transversely extending cargo connecting cable 28; when the first action of the moving combined pick up hook and discharging means striking the stationary cargo connecting cable 28, will be to operate the tong arms 91 and 91′ to discharge the cargo C into tipping receptacle 19, from which it is delivered into the hopper 17 either through the chute 36, or by rotation of the upper end of the tipping receptacle, depending upon the velocity with which the discharged cargo C strikes the upper end of the tipping receptacle 19.

Simultaneously, the hook arm 87 will have caught the transversely extending cable 28 and due to the yielding resistance of the unwinding reaction provided by the spring pressed brake shoe 103, the cable 52 will first be payed out until a velocity has been imparted to the picked up cargo equal to the velocity of the aircraft, the distance that the cable is required to be payed out, depending as aforesaid on the weight of the cargo to be picked up.

When the picked-up cargo has attained the velocity of the moving aircraft, the pilot or other operator in the aircraft may turn the crank 101 to reel in the cable and bring the picked-up cargo within the aircraft, after which the cable may be reeled out for discharging and picking up other cargos.

The spring pressed brake shoe 103 is preferably adjustably mounted in the frame 96, so that the pressure of the shoe 103 against the outwardly extending brake drum 106 with which the barrel end 57' is preferably provided, may be varied to provide any desired torque for resisting the unwinding of the reel barrel, so that cargos of different weights may be picked up.

For this purpose, the brake shoe 103 preferably includes a curved face 107 for abutment against the brake drum 106, and the brake shoe also includes a wedge face 108 opposite the curved face 107.

A roller 109 is rotatably mounted on the reel frame 96, the axis of the roller 109 being parallel with the reel barrel axis, so that the resisting torque applied by the brake shoe 103 to the reel barrel, depends on the relative force which wedges the brake shoe 103 between the roller 109 and the brake drum 106.

This force is supplied by the compression spring 110, and the loading of the spring may be varied by the screw 111 which is mounted in the frame 96, and between the inner end 112 of the screw and the opposite end 113 of the brake shoe, the spring 110 is interposed.

I claim:

A reel for aircraft cargo handling apparatus and the like, includnig a reel barrel, a cargo handling cable for being wound about the reel barrel, a groove formed in the barrel, a lug extending from a side of the groove, a head on the reel end of the cable, a neck groove in the head, and the head normally lying in the barrel groove and releasably secured therein by the lug extending into the neck groove.

In testimony that I claim the above, I have hereunto subscribed my name.

MANUEL CASTRO.